Patented May 24, 1932

1,859,706

UNITED STATES PATENT OFFICE

WERNER LANGE, OF DESSAU-ZIEBIGK IN ANHALT, GERMANY, ASSIGNOR TO GENERAL ANILINE WORKS, INC., OF NEW YORK, N. Y., A CORPORATION OF DELAWARE

MANUFACTURE OF AZO-DYES

No Drawing. Application filed October 6, 1930, Serial No. 486,866, and in Germany October 16, 1929.

My present invention relates to a new process of manufacturing azo dyes and more particularly to direct dyes for cotton and to pigments which are fast to the action of light and to washing.

I have found that very valuable dyes are obtainable by subjecting a nitro-benzoylated azo dye made, for instance, by diazotizing a mono-nitro-benzoylated diamino-arylsulfonic or carboxylic and coupling the diazo compound with any azo component or by condensing an aminoazo-dye with nitrobenzoylchloride, to an alkaline reduction under mild conditions, so that two molecules of the dye are linked together with formation of an azo group or azoxy group in the following manner

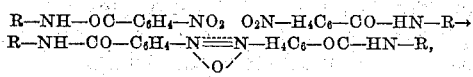

R meaning the radical of an azo dye. As I cannot say with certainty whether the two molecules of the nitro-benzoylated dye are united by the reduction process with formation of an azo group or azoxy group, I have indicated these two possibilities by dotted lines.

The substances thus obtainable are distinguished by their good affinity for the cotton fiber peculiar to the amino products in a very small degree only, and by their fastness to acids.

The following examples illustrate the invention, the parts being by weight:—

*Example 1.*—64.6 parts of the mono-azo dye, obtainable by diazotizing 1-amino-4-(4'-nitrobenzoyl-amino) benzene-2-sulfonic acid and coupling with 1-sulfophenyl-3-methyl-5-pyrazolone, are dissolved in 1000 parts of water of 60° C. and mixed, while stirring for 3 hours at 60° C., with a solution of 15 parts of sodium hydroxide and 17 parts of commercial grape sugar. The dye is then precipitated by means of sodium chloride and pressed as usual. It dyes cotton a bright golden yellow shade fast to acids and to light.

By substituting either benzidine-disulfonic acid, or diaminostilbenedisulfonic acid or 4.4'-diaminodiphenylurea-3.3'-disulfonic acid for 1.4-diamino-benzene-2-sulfonic acid, very similar but somewhat more reddish dyes are obtained.

*Example 2.*—73.3 parts of the mono-azo dye, obtainable by coupling 4-(4'-nitrobenzoylamino)-1-amino-benzene-2.6-disulfonic acid with 2-amino-8-hydroxy-naphthalene-6-sulfonic acid in the presence of acetic acid, are dissolved in 2000 parts of water and mixed, while stirring for 3 hours at 40° C., with a solution of 18 parts of sodium hydroxide and 17 parts of commercial grape sugar. The dye is then precipitated as usual. It dyes cotton a beautiful bluish-red tint.

*Example 3.*—42.1 parts of the mono-azo dye obtainable from 2-diazonaphthalene-4.8-disulfonic acid and 1-methyl-3-aminobenzene are dissolved together with 10.6 parts of sodium carbonate in 1000 parts of water. Then 10 parts of sodium bicarbonate and while vigorously stirring 20.5 parts of 4-nitrobenzoylchloride (preferably dissolved in benzene or acetone) are added in the course of an hour. Stirring is continued until no free amino group is detectable in the starting material. The nitrobenzoylated dye is separated by addition of common salt and separated from the mother liquid.

Then the dye is stirred again with 1000 parts of water of 60° C. and reduced with 15 parts of caustic soda and 17 parts of grape sugar. After addition of common salt the dye is separated from the liquid and worked up in the usual manner. It dyes cotton a greenish yellow of excellent fastness to light.

When treating in the like manner, a disazo dye obtainable by coupling 4-diazo-azo-benzene-4'.3-disulfonic acid with 1-methyl-3-aminobenzene, a dye is obtained dyeing cotton in orange tints of similar fastness.

*Example 4.*—18.2 parts of 5-nitro-2-amino-benzene-1-carboxylic acid are diazotized as usual in an aqueous solution and coupled in the cold with a soda alkaline solution of 34.8 parts of 1-ethoxy-8-hydroxynaphthalene-3.6-disulfonic acid. Then 4 parts of sodium hydroxide and 15.6 parts of sodium sulfide are added. The mixture is stirred at about 60° C. for an hour, whereat the orange color changes in blue. The amino dye thus obtained, is separated from the mother liquor after addition of common salt and hydrochloric acid. This dye is dissolved again in about 1000 parts of water, 15 parts of sodium bicarbonate are added and then, drop by drop while vigorously stirring, a solution of 20 parts of para-nitrobenzoylchloride dissolved in acetone. Thus, the nitrobenzoyl compound is formed showing a bluish red color. If a free amino group is no more detectable, common salt is added and the dye is separated from the liquid.

The nitrobenzoylated dye corresponding probably to the formula

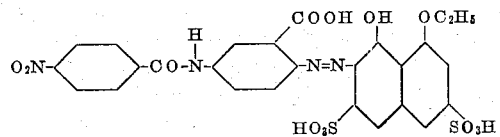

is then stirred with about 1500 parts of water at a temperature of about 60° C.; a solution of 16 parts of sodium hydroxide and 16 parts of grape sugar, is added and the mixture is stirred at the same temperature for some hours. The reaction product is separated by addition of common salt. The reduced dye, scarcely, is differentiated in its shade from the nitro dye. It shows, however, a greater solubility in water and a better affinity for the cotton fiber. It dyes cotton vivid bluish red; by an after-treatment with copper salts, this dyeing changes in red violet and shows an extraordinary fastness to light. The copper compound of the dye may likewise be made in substance by dissolving the dye in water, by adding, for instance, copper sulfate and sodium carbonate and by separating the reaction product with common salt. It forms with water a red violet solution and dyes cotton in the same shade of good fastness to light.

*Example 5.*—25.3 parts of 1-aminobenzene-2.5-disulfonic acid are diazotized as usual and united with a solution of 10.7 parts of meta-toluidine in the presence of acetic acid. The dye is separated from the liquor, stirred again with water and diazotized for a second time by addition of hydrochloric acid and of sodium nitrite. Then, 13.7 parts of 1-methyl-3-amino-4-methoxy benzene and sodium acetate are added until the diazo reaction has disappeared. The disazo-dye separated in the known manner, is dissolved again in 1000 parts of water in the presence of sodium carbonate and transformed into the nitrobenzoyl compound by addition of 15 parts of sodium bicarbonate and 20 parts of para-nitrobenzoyl chloride. The solution of the dye originally reddish brown, changes into a brownish yellow and becomes thickly slimy. When the reaction is complete, 50 parts of common salt are added and the dye is separated from the liquor. It probably corresponds to the formula

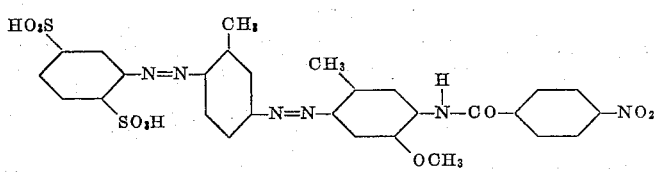

Thereupon the dye is stirred again with 1000 parts of water. At a temperature of about 50° C. 16 parts of caustic soda and 16 parts of grape sugar are added. The mixture is stirred for about 3 hours. The reduced dye is separated by addition of about 125 parts of sodium chloride and separated from the liquor. It is distinguished from the nitro dye scarcely by its shade, but by its greater solubility in water and by its better affinity for the cotton fibers. It dyes cotton vivid yellow brown shades of excellent fastness to light.

My present invention is not limited by the foregoing examples or by the specific details given therein. Other nitrobenzoylated amino dyes may be reduced in a completely analogous manner. Amino-dyes nitrobenzoylated with ortho or meta benzoylchloride may be used as starting materials.

Alternatively, I may use for reducing the nitro compound an agent of mild action other than grape sugar as, for instance, sodium sulfide or zinc dust, whereat by selecting a suitable amount thereof and a suitable temperature a further reduction of the azo group or groups originally contained in the dyes is avoided. The best manner of proceeding is found in every case by a simple experiment.

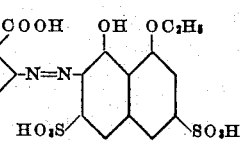

What I claim is:—

1. The process which comprises acting upon a nitrobenzoylated amino azo dye with a reducing agent which partially reduces the nitro groups and links together two molecules of the nitrobenzoylated dye with formation of an atomic linkage of the group consisting of azo and azoxy.

2. The process which comprises acting upon a nitrobenzolated amino azo dye with a reducing agent in the presence of an alkali which partially reduces the nitro groups and links together two molecules of the nitrobenzolated dye with formation of an atomic linkage of the group consisting of azo and azoxy.

3. The process which comprises acting upon a nitrobenzolated amino azo dye with grape sugar in the presence of an alkali, the grape sugar being present in an amount necessary for a partial reduction of the nitro groups to form an atomic linkage between two molecules of the nitrobenzoylated dye of the group consisting of azo and azoxy.

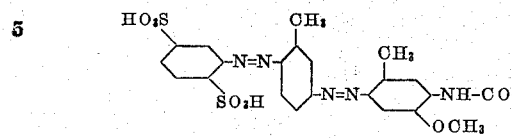

4. The process which comprises acting upon a nitrobenzoylated amino azo dye of the formula

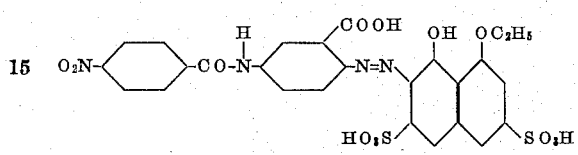

with grape sugar in the presence of sodium hydroxide, the grape sugar being present in an amount necessary for a partial reduction of the nitro groups to form an atomic linkage between two molecules of the nitrobenzoylated dye of the group consisting of azo and azoxy.

5. The process which comprises acting upon a nitrobenzoylated amino azo dye of the formula

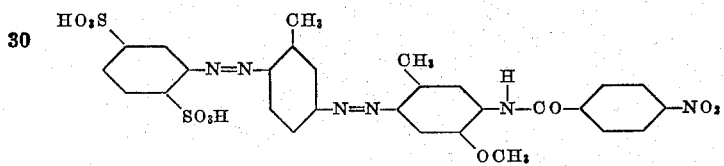

with grape sugar in the presence of sodium hydroxide, the grape sugar being present in an amount necessary for a partial reduction of the nitro groups to form an atomic linkage between two molecules of the nitrobenzoylated dye of the group consisting of azo and azoxy.

6. As new products the direct dyes for cotton corresponding to the general formula

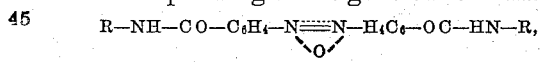

R meaning the radical of an azo dye, said dyes having an excellent affinity for the cotton fiber and dyeing cotton with tints fast to the action of acids.

7. As a new product the direct dye for cotton corresponding as free acid probably to the formula

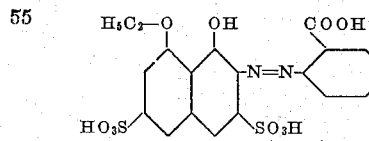

said dye being freely soluble in water and having a good affinity for the cotton fiber, dyeing the latter a vivid bluish-red which by an aftertreatment with a copper salt changes to red violet and shows an extraordinary fastness to light.

8. As a new product the direct dye for cotton corresponding as free acid probably to the formula

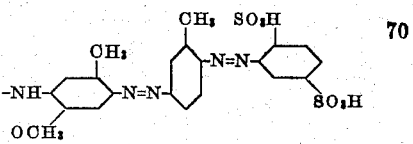

said dye being freely soluble in water, having a good affinity for the cotton fiber and dyeing the latter yellow brown shades of excellent fastness to light.

In testimony whereof, I affix my signature.

WERNER LANGE.